Feb. 14, 1967        H. OETIKER        3,303,669
CLAMP STRUCTURE WITH CORRUGATED INSERT RING
FOR RELATIVELY HARD, INELASTIC PARTS
Filed Jan. 21, 1964
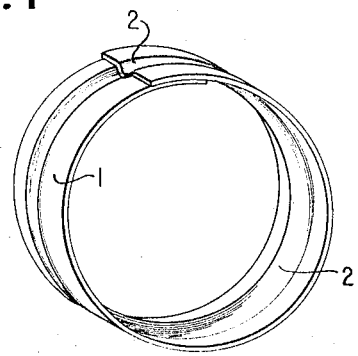
FIG. 1
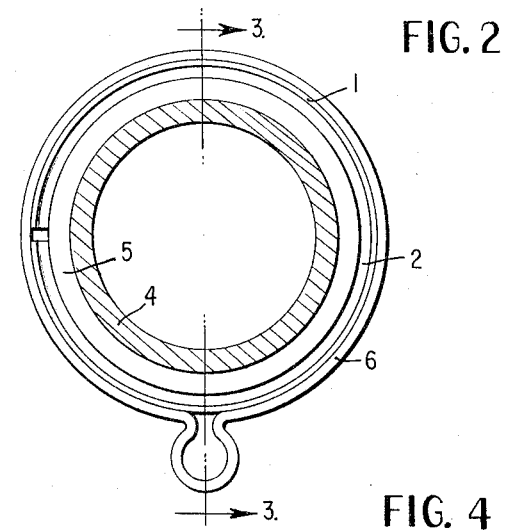
FIG. 2
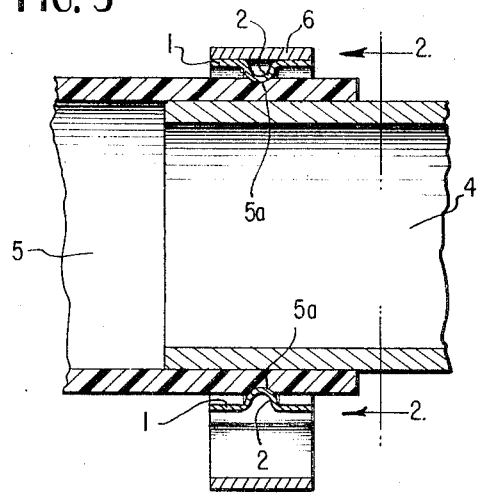
FIG. 3
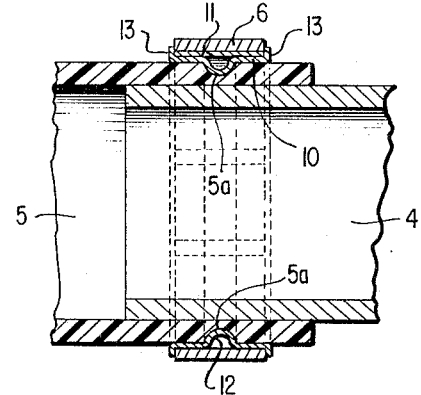
FIG. 4
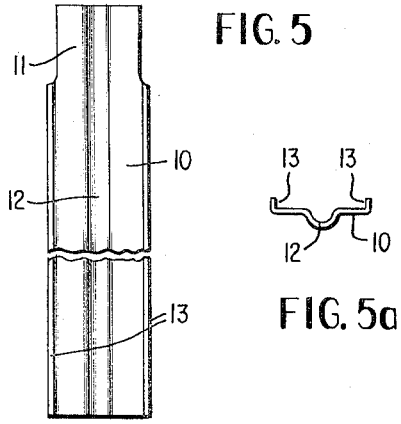
FIG. 5
FIG. 5a
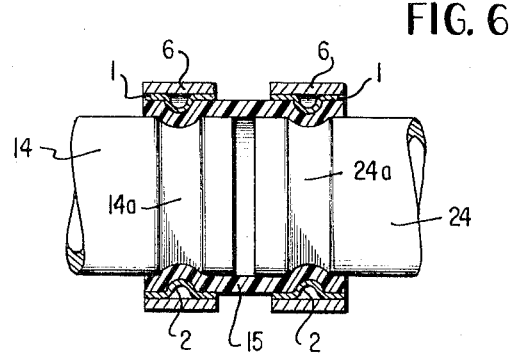
FIG. 6
INVENTOR.
HANS OETIKER
BY Paul M. Craig, Jr.
ATTORNEY :::::: {.patent-header}
United States Patent Office 3,303,669

Patented Feb. 14, 1967
::::::

3,303,669
CLAMP STRUCTURE WITH CORRUGATED INSERT RING FOR RELATIVELY HARD, INELASTIC PARTS
Hans Oetiker, 21 Oberdorfstrasse, Horgen, Switzerland
Filed Jan. 21, 1964, Ser. No. 339,224
Claims priority, application Switzerland, Jan. 29, 1963, 1,090/63
11 Claims. (Cl. 64—11)

The present invention relates to a clamp, and more particularly to an improved hose clamp provided with an intermediate ring that makes possible the use of the clamp with certain materials and in certain applications.

Use is made for purposes of clamping hoses onto pipe ends, coupling parts, connecting nipples or the like, of hose clamps which are adapted to be contracted along the hose circumference and thus press the hose onto the pipe or extension of the coupling part. Endless or closed rings with ear-shaped folds or lugs are used for the contraction which are usually contracted by means of pincers. Furthermore, hose connections are known in the prior art with bands which are adapted to be contracted by means of threaded pieces and threaded bolts.

However, with such clamps, it is prerequisite that the hose material offers a good deformability when pressing the ring of the clamp into the hose surface. Consequently, the hose material should not be excessively hard. Hoses made of rubber fulfill best these requirements.

However, recently hoses have come into use which are made of plastic material. This plastic material also possesses a certain deformability; however, the deformability thereof is considerably smaller than with rubber at normal temperatures; that is, at room temperature and below. Such deformability oftentimes is not sufficient with hose clamps in order to clamp the hose unobjectionably and satisfactorily onto the pipe member to be connected upon contraction of the clamp.

The present invention eliminates these disadvantages. The present invention starts with the concept to realize the compressing action of the hose surface with plastic material and the like not over the entire surface of the width of the clamp but to limit the compressing action over a narrow width of the clamp whereby the hose clamps available heretofore can be continued to be used as before.

The present invention is concerned with a hose clamp for hoses and pipes of plastic or similar material. With plastic hoses one deals above all with a material which is harder at room temperature and below such temperature and therefore is less easily deformable than the material such as rubber, caoutchouc, etc., used heretofore with the hoses. Only at higher temperatures the hardness decreases again. The plastic material then becomes softer than rubber at these higher temperatures.

The present invention essentially consists in a sheet-metal strip which is bent into an unclosed or open ring and is provided in the circumferential direction with an inwardly directed corrugation or bead, and in that this ring is inserted as intermediate ring between the hose clamp and the plastic hose in such a manner that upon contraction of the hose clamp, the corrugation or bead is pressed into the surface of the plastic hose and thus the hose is clamped onto the pipe piece along the pressure area of the corrugation or bead.

Accordingly, it is an object of the present invention to provide a clamp structure which avoids by simple and inexpensive means the shortcomings and drawbacks encountered with the prior art constructions.

It is another object of the present invention to provide a clamp structure which remedies by the use of an inexpensive and easily manufactured insert piece the disadvantages otherwise encountered with the use of hose materials that are relatively hard and little deformable at ordinary temperatures.

Another object of the present invention resides in the provision of an intermediate insert ring for a clamp which assures an operationally completely reliable clamping of the hose onto the connecting piece upon contraction of the clamp.

A further object of the present invention resides in the provision of a clamp structure utilizing an insert which not only can be manufactured relatively easily and inexpensively but which also can be installed without difficulty into existing clamps.

Still another object of the present invention resides in the provision of an insert member for use with a clamp of the type described hereinabove which increases the versatility of application of the clamp.

These and further objects, features and advantages of the present invention will become more obvious from the following description when taken in connection with the accompanying drawing which shows, for purposes of illustration only, several embodiments in accordance with the present invention and wherein:

FIGURE 1 is a perspective view of an insert member in accordance with the present invention for use with a clamp;

FIGURE 2 is a transverse cross-sectional view through a first embodiment of an assembled clamp structure in accordance with the present invention, taken along line 2—2 of FIGURE 3;

FIGURE 3 is a longitudinal axial cross-sectional view through the clamp structure of FIGURE 2, taken along line 3—3 of FIGURE 2;

FIGURE 4 is a longitudinall axial cross-sectional view through a modified embodiment of a clamp structure in accordance with the present invention;

FIGURE 5 is a partial plan view of a modified embodiment of an insert member in accordance with the present invention;

FIGURE 5a is an elevational view of the insert member of FIGURE 5; and

FIGURE 6 is an axial cross-sectional view through an assembled clamp structure in accordance with the present invention elastically connecting with one another two shafts.

Referring now to the drawing wherein like reference numerals are used throughout the various views to designate like parts and more particularly to FIGURE 1, this figure shows in perspective view the intermediate ring which is constituted by a ring-shaped bent-together sheet-metal strip 1. An inwardly directed corrugation or bead 2 is pressed into the sheet-metal strip 1 in the longitudinal direction thereof. The two ends of the strip 1 overlap in FIGURE 1. However, the ends thereof may also be disposed at a certain distance from one another.

FIGURES 2 and 3 illustrate the main application of the present invention as intermediate ring with hose clamp or fastening means. The hose 5 is placed over the pipe or tubular member 4. The hose 5 does not consist of easily deformable rubber but instead of plastic material difficult to deform at lower temperature, approximately at room temperature. The hose 5 is pressed over the member 4 by means of the hose clamp 6. The hose clamp 6 may thereby be of any suitable known construction such as, for example, described in my prior Patent No. 3,082,498. Since the material of the hose 5 is not sufficiently deformable for application with hose clamps, the intermediate ring 1 of the present invention is inserted between the hose 5 and the clamp 6. The inwardly directed pressed-in corrugation or bead 2 presses with a small abutment surface and thus with a corresponding high specific pressure against the hose surface. As a result of this increased specific surface pressure along the pressed-in areas, the plastic material of the hose 5 is pressed-in so strongly notwithstanding the slight deformability thereof at low temperatures that a deformation up to the inner hose wall takes place, and thus the hose is pressed onto the pipe piece 4. Simultaneously, a good sealing takes place on the pipe 4 along the pressure area of the corrugation or bead 2. FIGURE 3 illustrates the assembled clamp structure of FIGURE 2 in longitudinal cross section. Reference numeral 5a designates the pressed-in place on the hose surface from where the pressure effect is transmitted by corresponding deformation of the hose up to the inwardly disposed pipe piece 4.

In case the plastic material becomes relatively soft, for example, at higher temperatures as compared to rubber, then the ring is pressed-in more strongly as shown in FIGURE 4. The ring 10 then comes into abutment with the two lateral halves against the hose surface. The corrugation of bead 12 is thereby pressed through up to a point in proximity of the inner wall as indicated at 5a. A particularly good sealing of the hose 5 on the pipe piece 4 thus results by the use of the corrugation or bead.

FIGURE 4 also shows outwardly directed, flanged portions 13 of the rims which results in a good guidance of the clamp. However, the flanged portions 13 are omitted at the place 11 of the strip overlap as shown in FIGURE 5.

The bead or corrugation 12 has the further advantage that the bending strength of the intermediate ring 1 is increased which is advantageous above all at the otherwise open places below the U-shaped folds or lugs. With higher operating pressures there exists at these places the danger of a pressing-through of the flow medium which is avoided by the reinforcement of the intermediate ring disposed over the same.

The intermediate ring can be used everywhere where it is essential to press a ring adapted to be contracted along its circumference onto a tubular piece, and whereby this tubular piece consists of a material that can be compressed elastically or plastically in differently strong ways. A pressing-in of the material is thereby achieved along a circumference line which suffices in order to assure a safe and tight clamping onto the pipe piece. Such a material can thereby exhibit a smaller or larger deformability against pressing-in on the surface thereof than, for example, rubber or caoutchouc.

Further application possibilities exist for the improved hose clamp in accordance with the present invention. For example, the improved hose clamp of the present invention may be used on hoses, cables, etc., which are provided with a wire-braiding and serve for the sheathing or the electric shielding. The braiding on such a hose or cable behaves mechanically in a similar manner as a plastic hose.

If the braiding consists of thin soft wires, then a pressing-in takes place as shown in FIGURE 4. If the braiding consists of hard wire, then a pressing-in takes place similar to the corrugation of the intermediate ring as shown in FIGURE 3.

A further possibility of application of the improved clamp of the present invention is illustrated in FIGURE 6. In this figure one shaft end 14 is connected by way of a short hose piece 15 with another shaft end 24. Hose clamps 6 with intermediate rings 1 according to the present invention serve for securing the intermediate piece 15 to the shaft ends 14 and 24. Grooves 14a and 24a are machined into the shaft ends in the places corresponding to those of the two corrugations or beads 2. By contracting the clamps 6, the hose 15 disposed underneath the two beads or corrugations 2 is pressed into the grooves 14a and 24a. The press-fit thus obtained results in a high static friction so that a considerable torque can be transmitted from one shaft to the other. The thus-obtained shaft coupling possesses a certain elastic yieldingness. Hence, the two shafts need not be aligned accurately with respect to one another.

While I have shown and described several embodiments in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. In a high pressure, endless hose clamp of the type operable to have a projecting fold thereof contracted for clamping relatively harder elastic parts such as hoses and pipes of plastic or similar material onto connecting members, with the fold being contracted within the area of its connection with the endless clamp,
   the improvement essentially consisting of a sheet-metal strip bent together into a ring and provided in the circumferential direction thereof with an inwardly directed relatively narrow corrugation, said ring being completely separate from said clamp and being adapted to be inserted as intermediate ring between the clamp and the plastic part to transmit the tensional and pressure forces produced exclusively by the clamp whereby upon contraction of the clamp the hose is securely clamped onto the connecting member along the pressure area of the corrugation.

2. The improvement according to claim 1, wherein the ends of the ring-shaped, bent-together sheet metal strip, which are disposed under the clamp, overlap one another.

3. The improvement according to claim 1, wherein the endless hose clamp consists of a metallic, substantially flat-band-like material and the inwardly directed corrugation is disposed approximately in the center of the sheet metal strip.

4. In a high pressure, endless hose clamp of the type operable to have a projecting fold thereof contracted for clamping relatively harder plastic parts such as hoses and pipes of plastic or similar material onto connecting members, with the fold being contracted within the area of its connection with the endless clamp,
   the improvement essentially consisting of a sheet-metal strip bent together into a ring and provided in the circumferential direction thereof with an inwardly directed relatively narrow corrugation, said ring being completely separate from said clamp and being adapted to be inserted as intermediate ring between the clamp and the plastic part to transmit the tensional and pressure forced produced exclusively by the clamp whereby upon contraction of the clamp the hose is securely clamped onto the connecting member along the pressure area of the corrugation, said sheet-metal strip being provided with flanged rim portions.

5. The improvement according to claim 4, wherein the ends of the ring-shaped, bent-together sheet metal strip, which are disposed under the clamp, overlap one another, and said sheet metal strip being provided with said flanged rim portions in all but the overlapping areas.

6. The improvement according to claim 4, wherein the dimension of the sheet metal strip between the flanged rim portion essentially corresponds to the width of the hose clamp.

7. A high pressure, endless hose clamp structure for clamping relatively hard parts which are plastically deformable only slightly, comprising:
   endless clamp means having a projecting fold operable to be contracted in the installed condition,
   and ring-shaped strip means provided in the circumferential direction thereof withinwardly directed relatively narrow corrugation means to limit the pressure area, said strip means being completely separate from said clamp means and being inserted as intermediate ring into the clamp means to transmit the tensional and pressure forces produced exclusively by said clamp means upon contraction of the fold thereof whereby upon contraction of the clamp means the plastic part disposed within said strip means is securely clamped onto the member to be connected along the pressure area defined by the corrugation means.

8. A hose clamp according to claim 7, wherein the ends of the strip means overlap one another in the inserted condition of the strip means.

9. A flexible coupling for connecting together two shaft ends, comprising:
   a first and second shaft end,
   a hose-like coupling part made of plastic material and slipped with the hollow ends thereof over said shaft ends,
   and two clamp means for securing said coupling part to said shaft ends each including an endless hose clamp having a projecting fold operable to be contracted and a sheet-metal strip bent together into a ring and provided in the circumferential direction thereof with an inwardly directed, relatively narrow corrugation, said ring being completely separate from a respective hose clamp and being inserted as intermediate ring between the clamp and the plastic coupling part to transmit the tensional and pressure forces produced exclusively by the corresponding clamp whereby upon contraction of the clamp the coupling part is securely clamped onto the corresponding shaft end along the pressure area defined by the corrugation.

10. A flexible coupling according to claim 9, wherein each shaft is provided with an annular groove near the end thereof, and the corrugations are disposed substantially over said grooves.

11. A flexible coupling according to claim 10, wherein each ring-shaped sheet metal strip is provided with flanged rim portions.

References Cited by the Examiner

UNITED STATES PATENTS

| | | | |
|---|---|---|---|
| 1,160,462 | 11/1915 | Taylor | 64—11 |
| 1,702,057 | 2/1929 | Murray | 64—11 |
| 1,978,195 | 10/1934 | Haas | 24—279 |
| 3,046,759 | 7/1962 | De Ford et al. | 64—11 |
| 3,061,339 | 10/1962 | Jewell | 285—236 |
| 3,082,498 | 3/1963 | Oetiker | 24—20 |
| 3,087,221 | 4/1963 | Armstrong | 24—279 |
| 3,142,881 | 8/1964 | Johnston | 285—253 |

FOREIGN PATENTS

| | | |
|---|---|---|
| 547,796 | 9/1956 | Italy. |
| 791,762 | 3/1958 | Great Britain. |

FRED C. MATTERN, Jr., *Primary Examiner.*

BROUGHTON D. DURHAM, MILTON KAUFMAN, *Examiners.*

H. C. COE, *Assistant Examiner.*